United States Patent

Beaulieu

[11] Patent Number: 5,451,087
[45] Date of Patent: Sep. 19, 1995

[54] DAMPER FOR A GRAPPLE

[75] Inventor: Benoit L. Beaulieu, Prince George, Canada

[73] Assignee: Shirley Beaulieu, Prince George, Canada

[21] Appl. No.: 59,394

[22] Filed: May 11, 1993

[30] Foreign Application Priority Data

Dec. 10, 1992 [CA] Canada ................ 2085017

[51] Int. Cl.⁶ .................... B66C 13/06; F16F 7/04
[52] U.S. Cl. .................... 294/119.4; 188/83
[58] Field of Search .................... 294/86.4, 119.4;
188/71.1, 71.9, 72.7, 73.2, 74, 83, 130, 366–369,
343, 381, 72.4; 403/113, 120; 414/626, 732–735,
738–740

[56] References Cited

U.S. PATENT DOCUMENTS

| | | | |
|---|---|---|---|
| 837,943 | 12/1906 | Mitchell | 188/73.2 |
| 884,967 | 4/1908 | Williamson | 188/130 |
| 911,412 | 2/1909 | Lang | 188/83 |
| 1,325,121 | 12/1919 | Snyder | 188/130 X |
| 1,372,327 | 3/1921 | Young | 188/83 X |
| 1,499,179 | 6/1924 | Mastrangel | 188/130 |
| 1,701,237 | 2/1929 | Justice et al. | 188/73.2 |
| 1,727,445 | 9/1929 | Rouanet | 188/130 |
| 1,738,980 | 12/1929 | Andrzejewski | 188/73.2 |
| 1,774,144 | 8/1930 | Jones | 188/130 |
| 1,808,700 | 6/1931 | Wendell | 188/130 |
| 2,001,599 | 5/1935 | Cohen | 188/369 X |
| 2,107,091 | 2/1938 | Swennes | 188/369 X |
| 2,181,988 | 12/1939 | Davis | 188/72.4 X |
| 2,742,107 | 4/1956 | Du Bois | 188/73.2 X |
| 3,525,547 | 8/1970 | Hiseler et al. | 294/106 |
| 3,592,503 | 7/1971 | Lundberg | 294/119.4 |
| 3,889,829 | 6/1975 | Dutton | 294/119.4 X |
| 4,417,759 | 11/1983 | Pierrot, III et al. | 294/119.4 |
| 4,572,567 | 2/1986 | Johnson | 294/119.4 |
| 4,573,728 | 3/1986 | Johnson | 294/119.4 |
| 4,609,081 | 9/1986 | Hungerford | 188/307 |
| 4,679,839 | 7/1987 | Damron | 294/119.4 |
| 4,715,641 | 12/1987 | Palmer | 294/119.4 |
| 4,717,191 | 1/1988 | Farmer | 294/119.4 |
| 4,723,639 | 2/1988 | Hungerford | 188/307 |
| 4,810,020 | 3/1989 | Powell | 294/119.4 |
| 5,096,247 | 3/1992 | Killen | 294/119.4 |
| 5,110,169 | 5/1992 | Shepherd et al. | 294/119.4 |

Primary Examiner—Johnny D. Cherry

[57] ABSTRACT

A combination of a first element rotationally coupled to a second element, with a damper or snubber for slowing the rotational movement, which has a core with a tapered surface, the core being affixed to the first element. A housing having a tapered surface is affixed to the second element. Axial alignment is maintained between the core and the housing and a selected friction force is developed between the tapered surfaces of the core and the housing so that movement of the joint is dampened.

5 Claims, 10 Drawing Sheets

NOTES:
-LOWER ASSEMBLY ROTATED 90°
-LOWER ASSEMBLY NOT ILLUSTRATED

FIG. 12A  TOP BRACKET

FIG. 12B  WELD-ON BRACKET

FIG. 12C  BOTTOM BRACKET

FIG. 12D  BOLT-ON BRACKET

FIG. 12E  TOP BRACKET

FIG. 12F  TOP & BOTTOM BRACKET / BOLT-ON BRACKET

FIG. 12G  BOTTOM BRACKET

DAMPER FOR A GRAPPLE

FIELD OF THE INVENTION

The present invention relates to a linkage design for the dampening or snubbing of joints or linkages.

BACKGROUND

In the forest industry, logs are loaded for transport by means of a hydraulically operated grapple attached to the carrier arm of a log skidder, track mounted loader, processor or other vehicle. This grapple has two claws which are opened and closed by the use of a hydraulic piston-cylinder which provides the force necessary for lifting or transporting heavy loads. The grapple is attached to the end of the carrier arm by means of a universal linkage having two axes of rotation set 90 degrees to one another (henceforth called a twin axis universal joint), thereby allowing free rotation in all directions.

While maneuverability of the grapple is desirable to facilitate loading, a number of problems are also associated with the free movement of an empty grapple. Primarily, the uncontrolled movement of the grapple poses a safety hazard to workers and results in excessive and premature wear on the component parts of the carrier arm linkage. Thus, dampening of the grapple movement is necessary.

Previous devices designed to control grapple movement have utilized multiple disks composed of different materials and applied by various means (see U.S. Pat. Nos. 4,573,728 to Johnson, 4,717,191 to Farmer and 4,810,020 to Powell). These techniques were subject to a number of difficulties including premature wear, erratic performance, the production of heat through friction, and a susceptibility to contamination from oil and moisture from the external environment.

U.S. Pat. No. 4,572,567 to Johnson, describes a snubber containing two rings bearing tapered surfaces driven together by hydraulic pressure. The configuration of the component parts poses a number of potential problems. Firstly, a frictional wedging action between the tapered elements and the axial pin is relied upon in order to indirectly increase frictional drag between the tubular housing and the linkage housing, thereby resulting in dampening; this arrangement places unnecessary torque on the axial pin, which is fixed and held from rotating on the linkage housing only by a single external bolt. Because of its location, this bolt is susceptible to physical damage from the external environment. Its failure would result in the free rotation of the axial pin, and a consequent disabling of the dampening action.

Secondly, the amount of friction produced by snubbing a two inch pin with such small friction-bearing surfaces is not sufficient to stop or even slow down a moving grapple weighing one ton. These friction-bearing surfaces would be subject to extreme wear.

Thirdly, Johnson describes a pair of plastic lip-type seals which enclose the hydraulic cavity, forming seals with the surface of the bore and the pin; these plastic elements are susceptible to a high rate of wear caused by friction, potentially leading to a leakage of fluid from the hydraulic cavity. Finally, the configuration of the linkage housing necessitates that hydraulic lines be connected to two independently rotatable elements, the tubular housing and the linkage housing, thereby exposing these lines to unnecessary stress.

The present invention overcomes the difficulties of previous snubbers through a simple new design.

SUMMARY OF THE INVENTION

The invention provides a constant and independent dampening action on the movement about each axis of a twin axis universal joint or on a single axis joint, while maintaining a low rate of wear and an immunity to contamination. The present invention does not rely on the axial pin for any snubbing action. Additionally, untrained personnel can easily change the parts of the joint.

The damper or snubber design for each axis consists of the following basic components set along each axial pin within a linkage housing: a core, a tapered bushing, a tapered housing, a spring washer or pressure plate, a means of applying pressure to the spring washer and a frictionless contact between the spring washer and the means of applying pressure. Pressure is applied to the spring washer by means of either manually tightened screws or a hydraulic ring, thereby forcing the tapered housing onto the tapered bushing. The tapered housing is fixed to an element external to the linkage housing (i.e. the carrier arm or the grapple), while the tapered bushing is indirectly fixed to the linkage housing by a core element; the tapered bushing slips over the core element and is fixed from rotating on the core, which is fixed to the linkage housing. The movement of the tapered housing onto the tapered bushing creates friction which provides the rotational dampening between the linkage housing and the external elements around the axial pin. It should be noted that the linkage housing is insulated from the pin through the use of sleeves, thereby preventing frictional contact and that the pin need not be fixed in relation to the linkage housing nor any of the dampening components. Furthermore, the damper may be externally affixed to a conventional, undampened linkage, in which case the axial pin does not participate in the damper assembly in any way.

The placement of a damper on each axial pin of the twin axis universal linkage enables control of the free movement of the grapple in both the fore and aft and the side to side directions. The unique tapered bushing and housing design of the damper provides an immunity to contamination from oil, moisture and premature wear, distinguishing it from previous damper designs. Furthermore, the expected wear may be estimated at 20% per year owing to the low number of moving parts.

BRIEF DESCRIPTION OF THE DRAWINGS

The invention may be best understood by reference to the accompanying drawings where.

DETAILED DESCRIPTION WITH REFERENCE TO THE DRAWINGS

Figure 1:
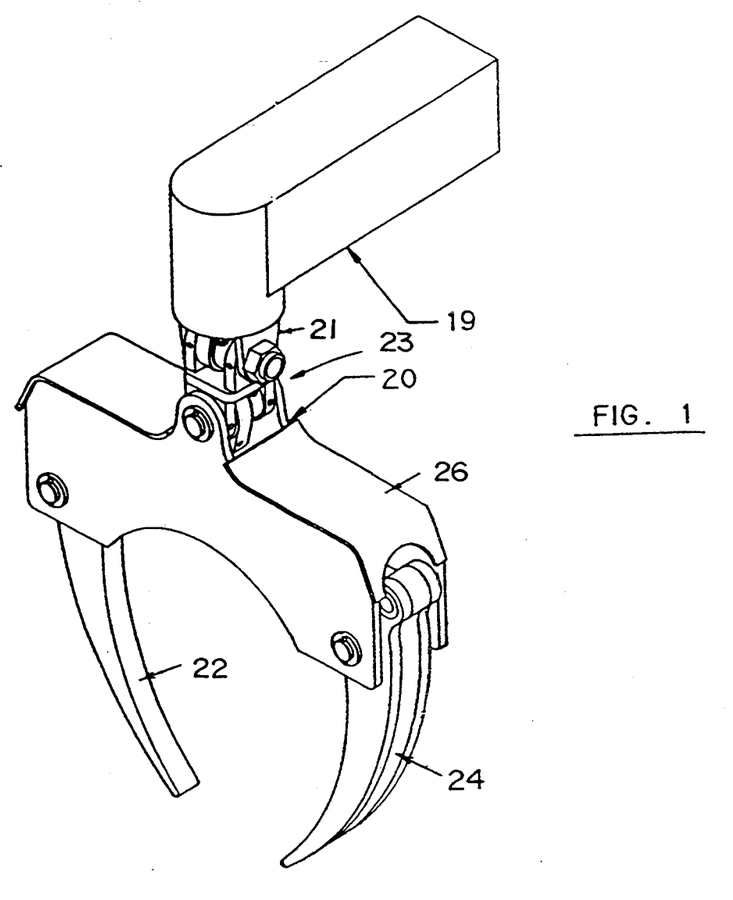
FIG. 1 is a partial view of a carrier arm and grapple, with the link or joint connecting the two.
Figure 2:
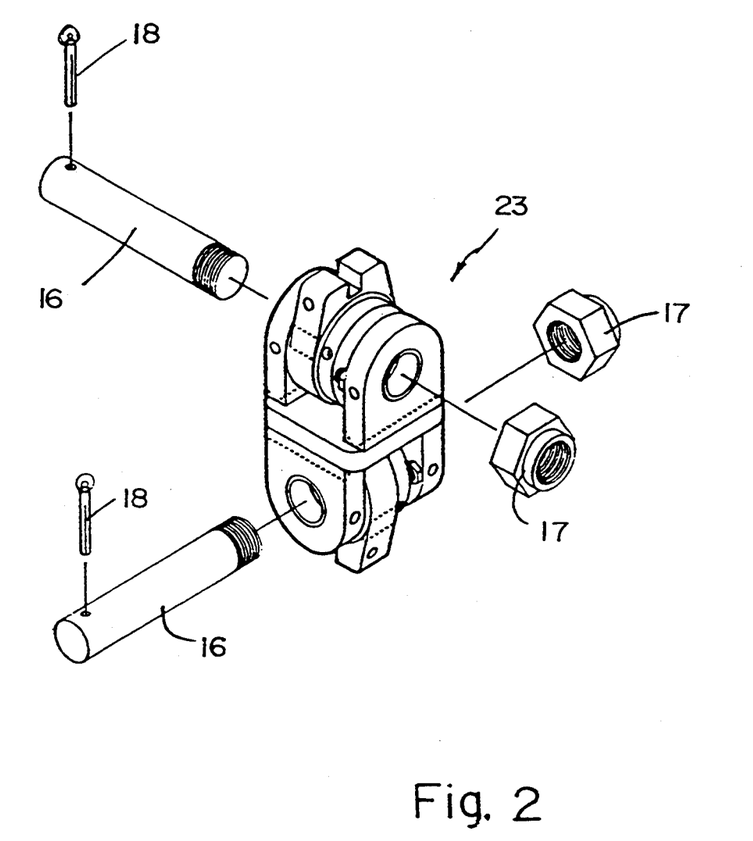
FIG. 2 is an close-up view of a damper assembly showing its relationship with the axial pins.

Referring to FIG. 1, there is shown a grapple 26 having opposed claws 22 and 24 pivoted in response to pressure applied to a hydraulic piston-cylinder unit (not shown). The grapple 26 is connected to a carrier arm 19 by a linkage 23 which is attached to the grapple 26 at the grapple bracket 20 and to the carrier arm 19 at the carrier arm bracket 21. The linkage 23 consists of two damper units 31a and 31b, with one set at right angles to the other as illustrated in FIG. 2. The axial pin 16 is threaded at one end and is prevented from sliding in and out of a bore hole in the linkage housing 2 by a cotter pin 18 and a threaded nut 17.

Figure 3:
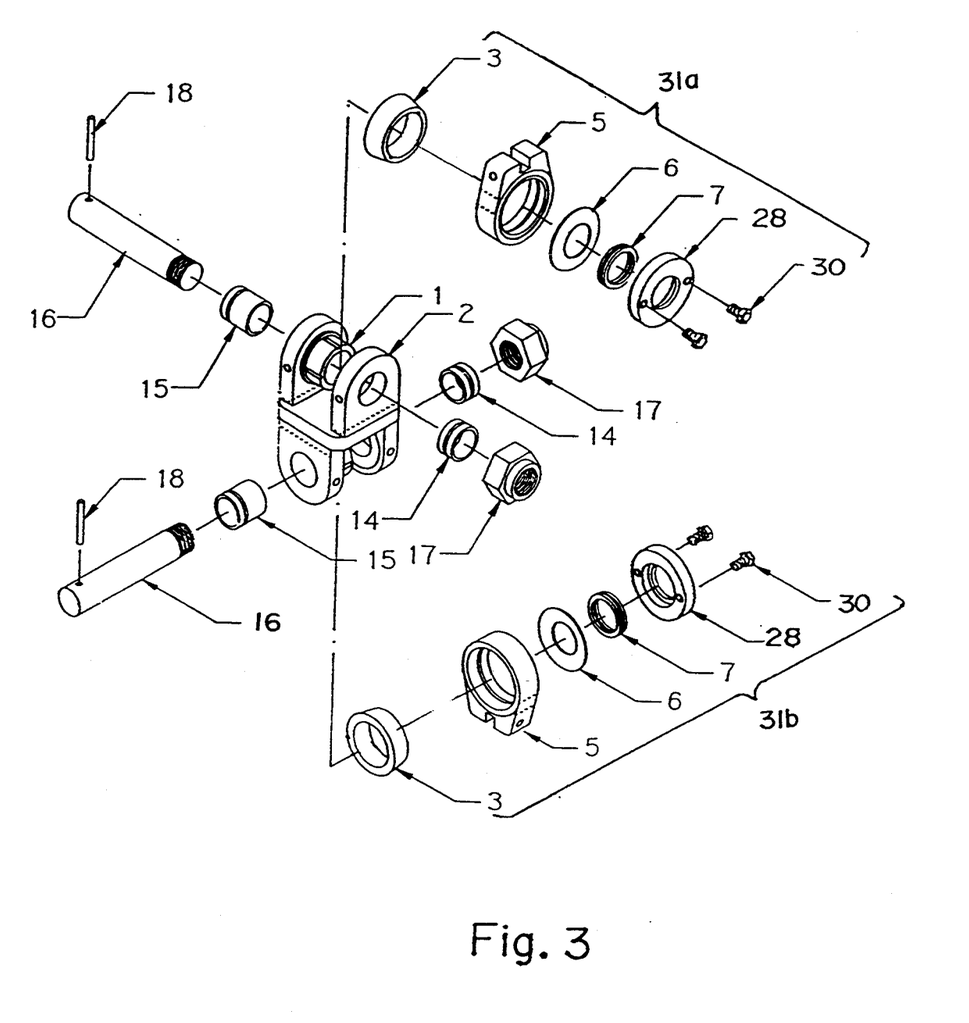
FIG. 3 is an exploded view of a damper assembly equipped with screws as a means of applying pressure.

The exploded view of FIG. 3 illustrates the alignment of the component parts of the dampers 31a and 31b along the axial pins 16. Damper parts are shown with like parts bearing like reference numbers. The damper components are insulated from frictional contact with the pin 16 by sleeves 14 and 15, allowing the pin 16 to be rotationally independent of the linkage housing 2 or any of the damper components.

The damper 31a consists of a core 1 which is fixed to the linkage housing 2. The core 1 has a tapered outer surface which mates with a tapered bushing 3 which slips over the tapered surface of the core 1. A tapered housing 5 with an inside taper matching that of the outside taper of bushing 3, fits over the tapered bushing 3. A spring washer 6 is fitted in a recess on the tapered housing 5.

There are two dampers or snubber units 31a and 31b on the linkage housing 2, an upper damper 31a to control the fore and aft motion of the grapple and a lower damper 31b to control the side to side motion of the grapple. The dampening action is provided by applying pressure to the spring washer 6 which, when compressed, forces the tapered housing 5 against the outside surface of the tapered bushing 3, and the inside surface of the tapered bushing 3 against the tapered core 1. The resulting friction between the tapered housing 5, the tapered bushing 3 and the core 1 provides the dampening action. As the tapered housing 5 of the upper damper is anchored to the carrier arm 19 (FIG. 1) and the core 1 is fixed to the linkage housing 2, the fore and aft motion of the linkage housing 2 with respect to the carrier arm 19 is thus dampened.

The dampening of the side to side motion is similarly accomplished as the tapered housing 5 of the lower damper is anchored to the grapple 26 (FIG. 1) while its core 1 is fixed to the linkage housing 2.

Figure 4:
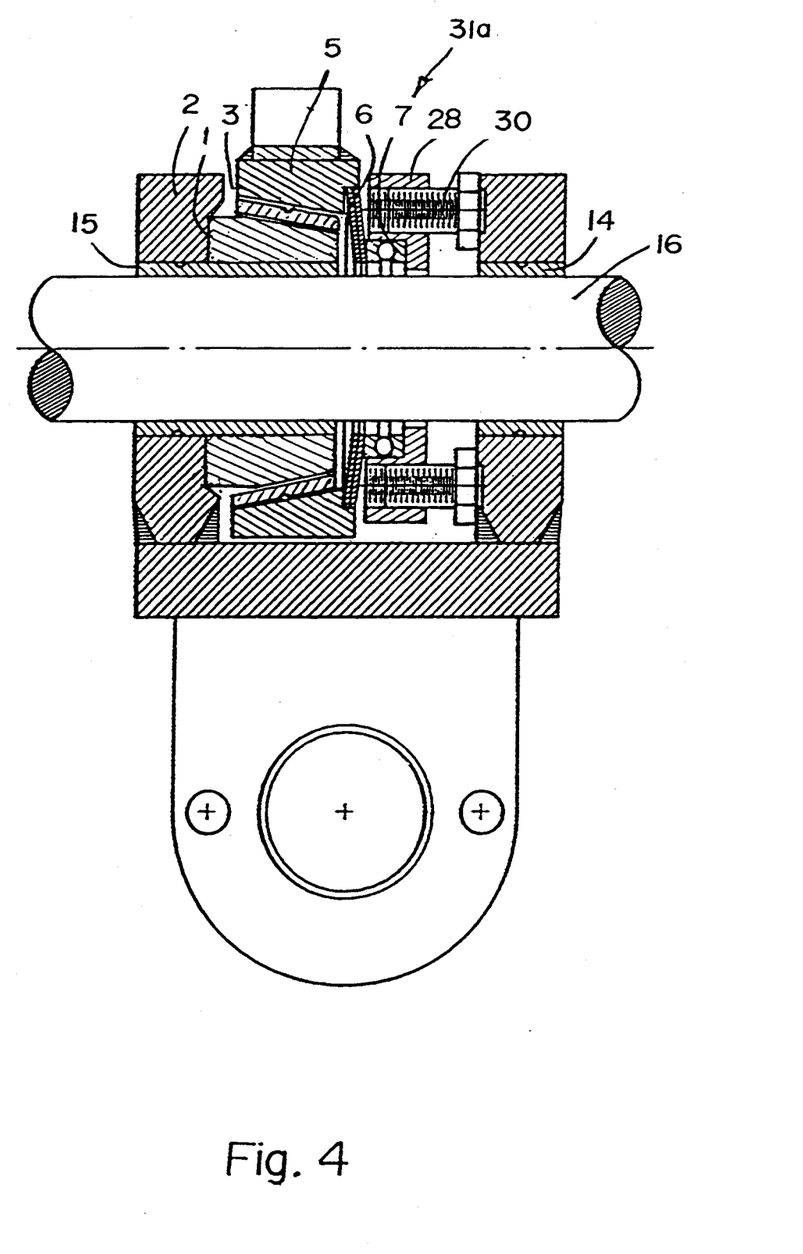
FIG. 4 is a sectional view of a damper assembly equipped with screws as a means of applying pressure.

FIG. 4 illustrates the damper assembly 31a in an activated state. The pressure required on tapered housing 5 through the spring washer 6 is provided by a pressure plate 28 and two adjusting bolts 30. The two adjusting bolts 30 have the head end recessed in the linkage housing 2 to prevent them and the pressure plate 28 from rotating or shifting. A thrust bearing 7 is recessed in the pressure plate 28 to provide a low friction contact between the pressure plate 28 and the spring washer 6, as the pressure plate 28 rotates with the linkage housing, while the spring washer 6 rotates with the tapered housing 5. When the two adjusting bolts 30 are turned counterclockwise, they extend out of the pressure plate 28, forcing the pressure plate 28 against the spring washer 6. This application of pressure to the pressure plate 28 through the spring washer 6 and thrust bearing 7, forces the tapered housing 5 onto the tapered bushing 3 and the latter onto the core 1, resulting in the frictional damping action.

Figure 5:
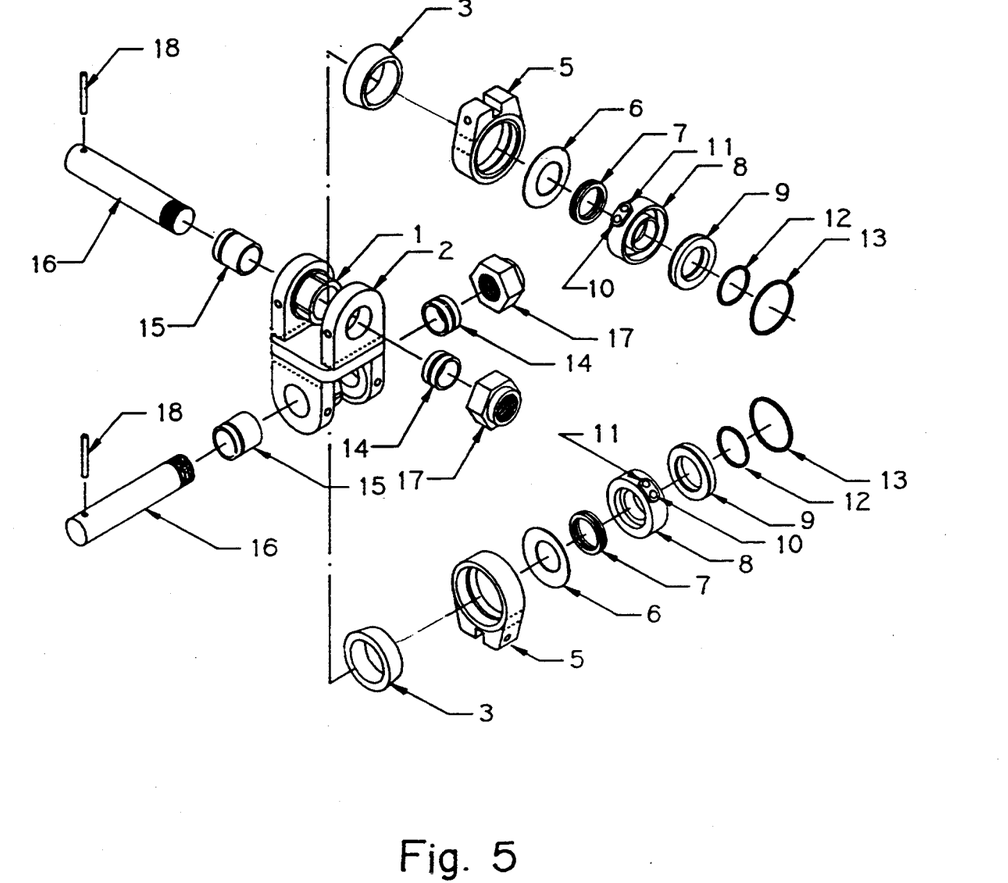
FIG. 5 is an exploded view of a damper assembly equipped with a hydraulic piston-cylinder as a means of applying pressure.
Figure 6:
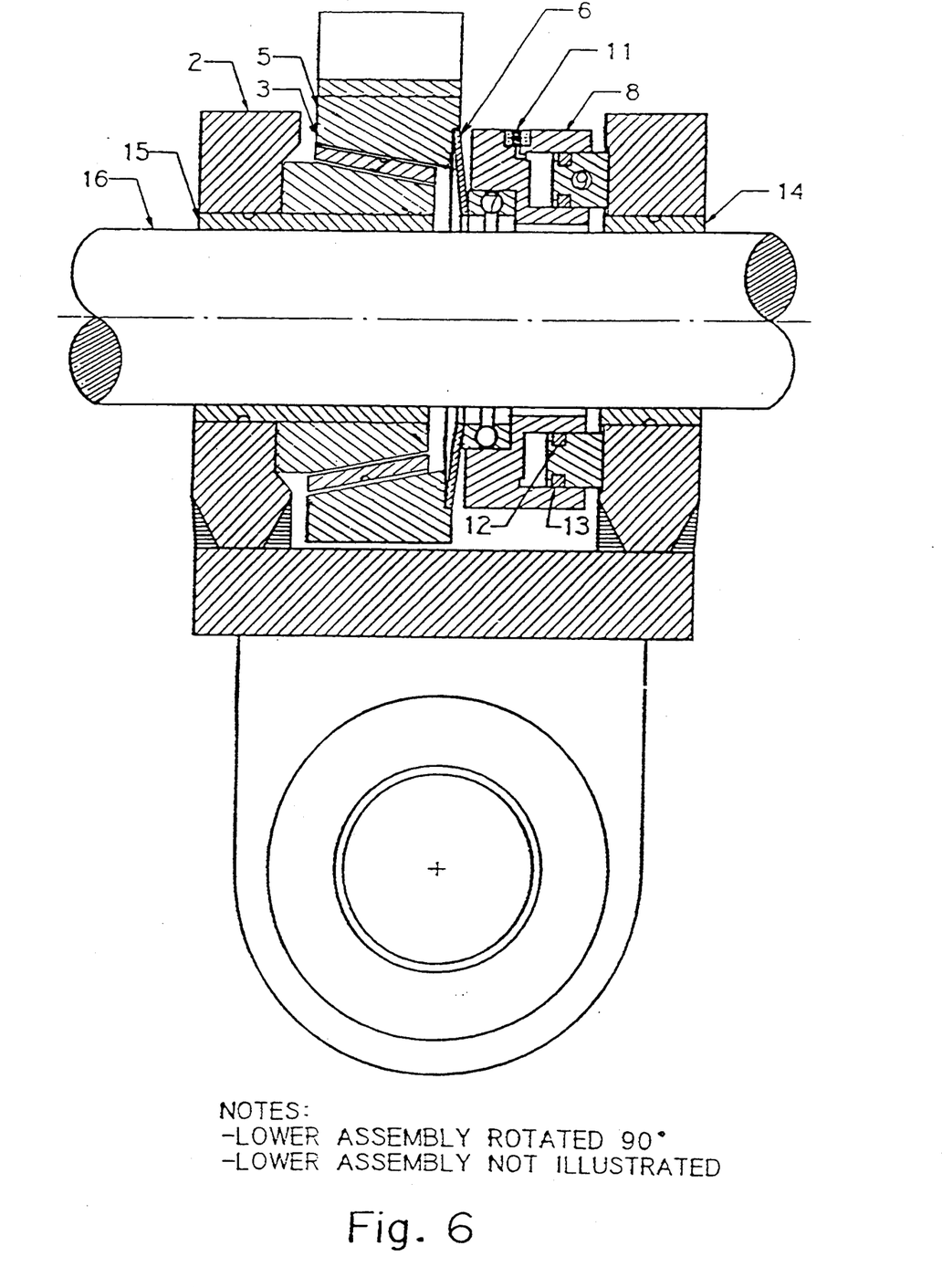
FIG. 6 is a sectional view of a damper assembly equipped with a hydraulic piston-cylinder as a means of applying pressure.

A hydraulic piston-cylinder butted against the inside of the linkage housing 2 may also be used to apply pressure to the spring washer 6 as shown in FIGS. 5 and 6. As above, a thrust bearing 7 is recessed in the body of the cylinder 8 to provide a low friction contact between the cylinder and spring washer 6. The hydraulic cylinder consists of two basic parts, the cylinder body 8 with lubricant ports 10 and 11 and the piston 9, as well as seals 12 and 13. When a lubricant is applied to the lubricant ports 10 and 11, the lubricant fills a cavity between the cylinder body 8 and the piston 9, forcing these members apart. The longitudinal expansion of the hydraulic cylinder acts to compress the spring washer 6, resulting in the frictional dampening action.

Figure 7:
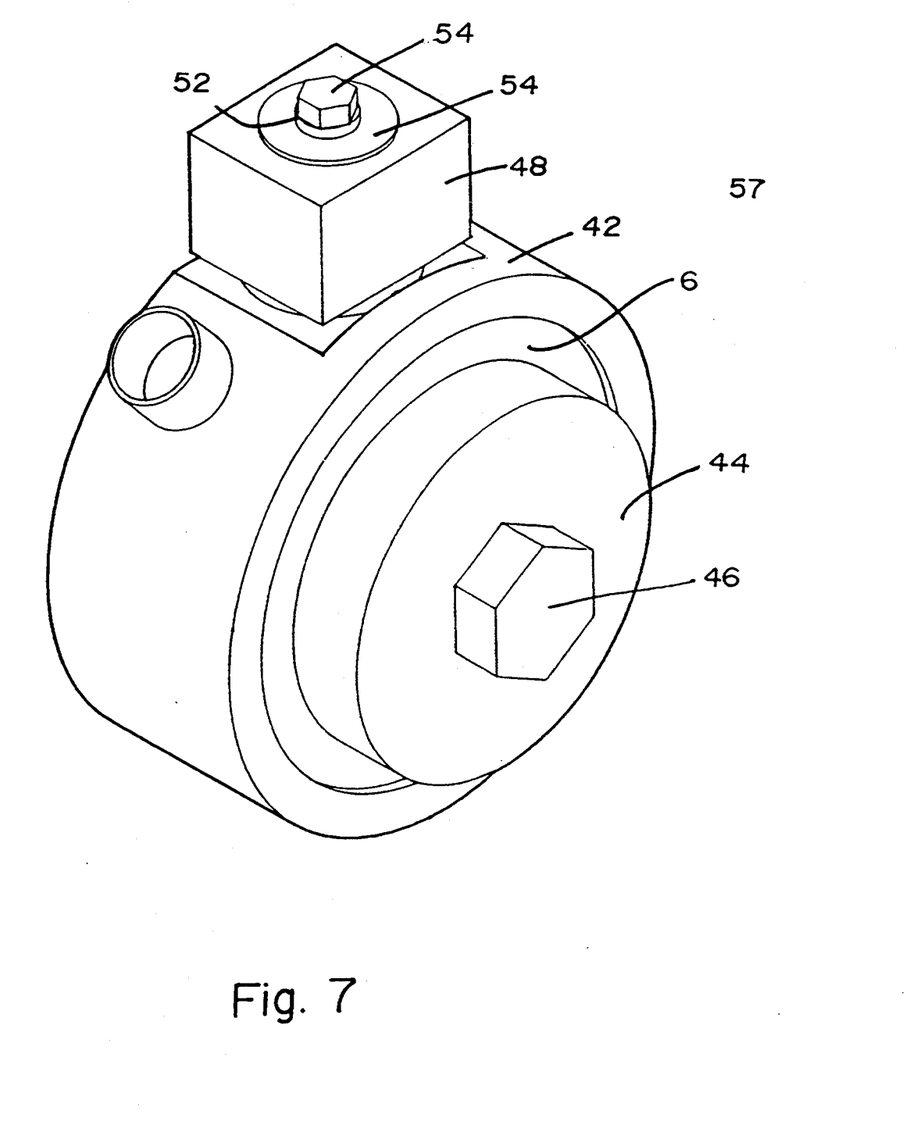
FIG. 7 is a view of an externally-mountable damper assembly.
Figure 8:
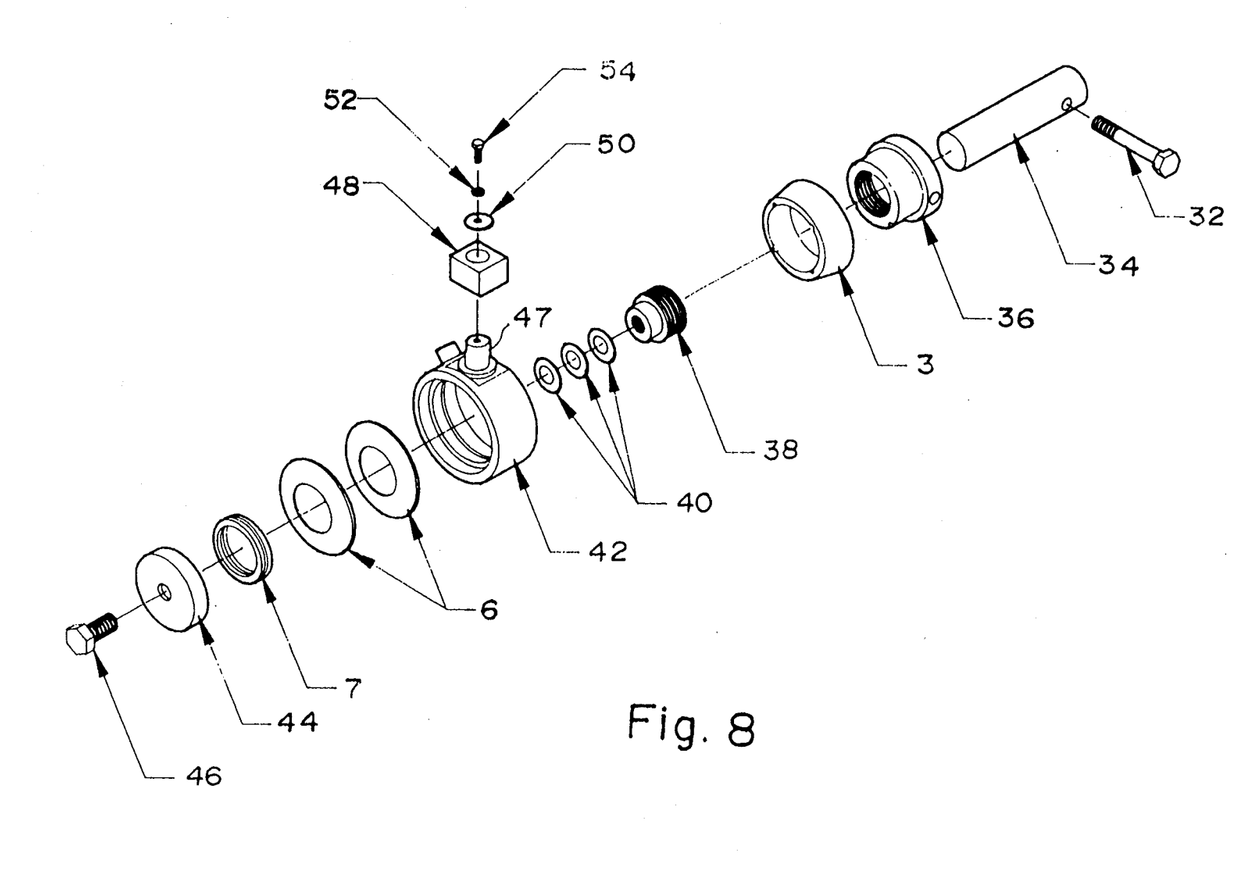
FIG. 8 is an exploded view of an externally-mountable damper assembly.
Figures 9, 10, 11:
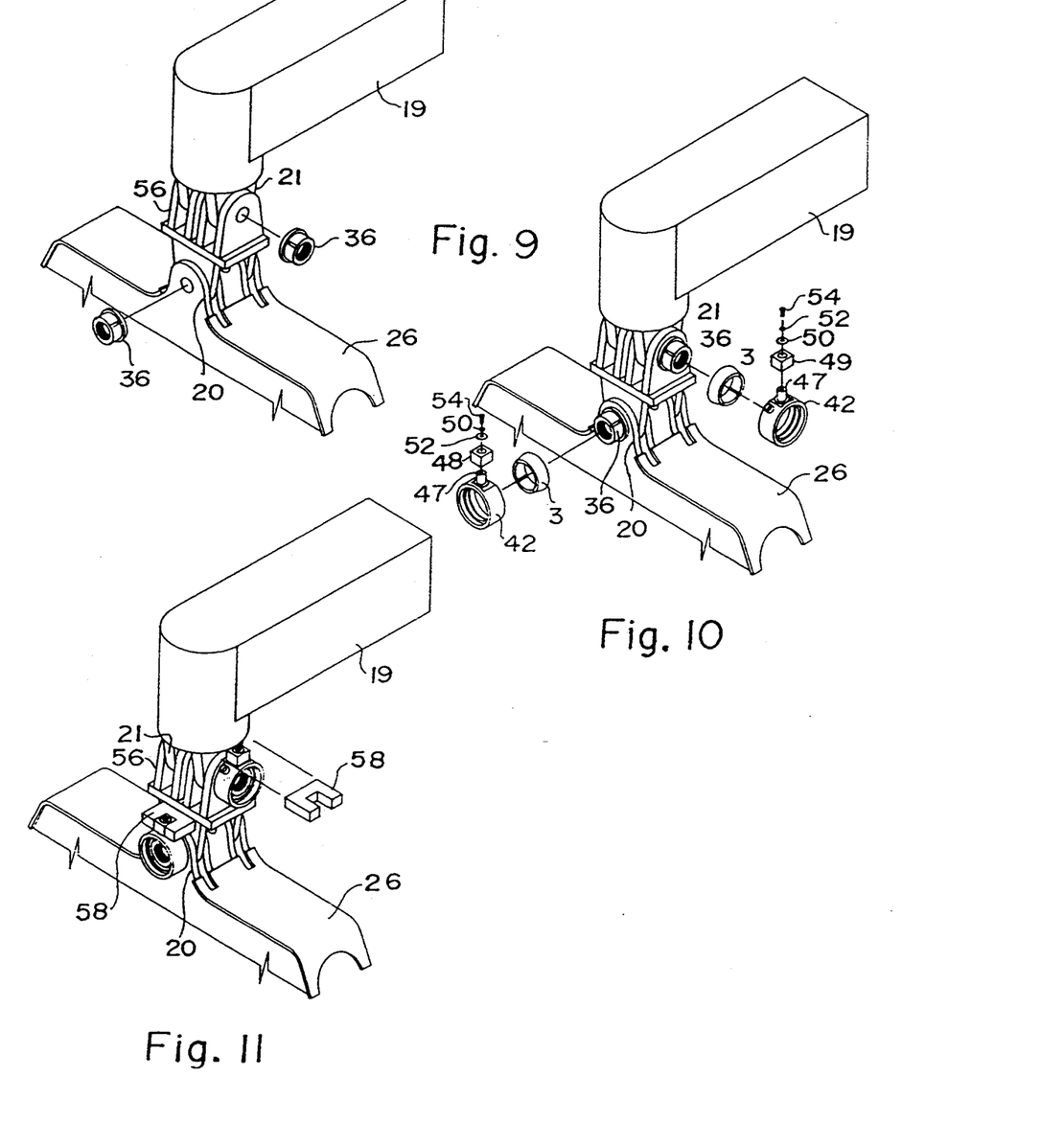
FIG. 9 shows the alignment of the core of an externally-mountable damper with a conventional, undampened link.
FIG. 10 shows the alignment of the externally-mountable damper assembly over a core which is affixed to an external element of a conventional, undampened link.
FIG. 11 shows the alignment of a mounting bracket affixed to an external element independent of the external element to which the core is affixed.
Figure 12A:
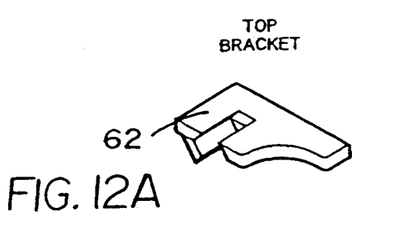
FIGS. 12A to 12G illustrate various configurations of mounting brackets for the externally-mountable damper assembly.
Figure 12B:
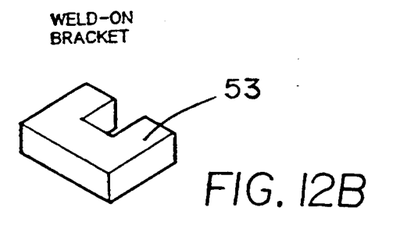
Figure 12C:
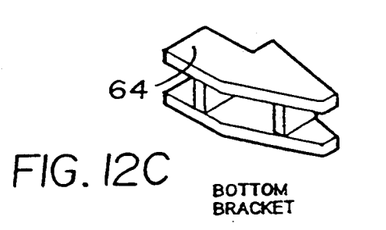
Figure 12D:
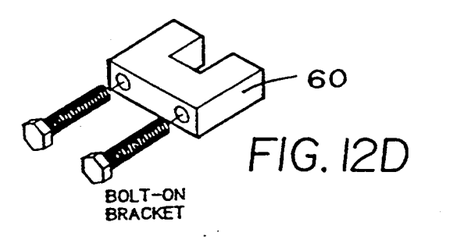
Figure 12E:
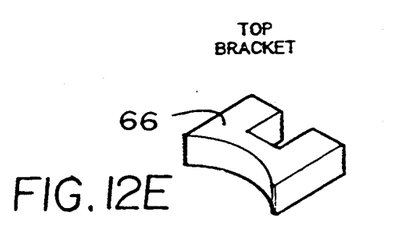
Figure 12F:
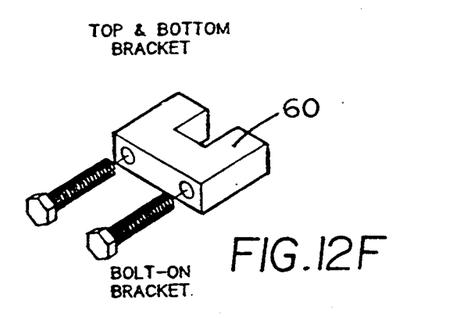
Figure 12G:
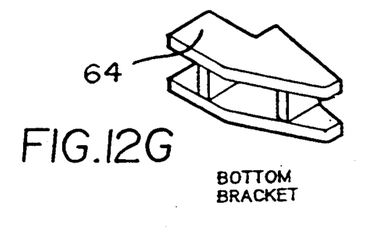

FIG. 7 shows an external view of an externally-mounted damper assembly 51, the component parts of which are shown in FIG. 8. In the case of the externally-mounted damper units, two independent units are affixed to a conventional linkage joint as shown in FIG. 11. The mode of action for the externally mounted damper assembly is the same as that described in FIGS. 1 to 6 (internal dampers), wherein the movement of a tapered housing 42 onto a tapered bushing 3 and movements of the latter onto a tapered core 36 create the frictional dampening. The tapered housing 42 is affixed to an element different from that to which the tapered core 36 is affixed. The axial pin 34 and cotter pin 32 do not play any role in the dampening action.

As with the dampers 31a and 31b described in FIG. 1 to 6 (internal dampers), a tapered bushing 3 is fitted over a core 36. The core 36 is welded or affixed to an external element of the linkage assembly (see FIGS. 9 and 10). This external element may be the linkage housing 56, the carrier arm bracket 21, or grapple bracket 20, depending on the configuration of the undampened linkage assembly.

While the tapered core 36 is affixed to one external element of the linkage assembly, the tapered housing 42 is affixed to another external element of the linkage assembly via a bracket assembly (see FIGS. 10 and 11). The bracket assembly may consist of a block 48 inserted over a shaft 47 on the tapered housing 42 having a threaded hole. The block 48 is held in place by a bolt 54 screwed into the threaded hole of shaft 47 with washers 50 and 52. The block 48 is held by a bracket 58 welded to the external element to which the core 36 is not affixed, thereby preventing the tapered housing 42 from rotating. The bracket may also be bolted to the external element 60, or take on other configurations 62, 64 and 66.

The core 36 has a threaded inner surface which receives a threaded insert 38. The threaded insert 38 has a threaded outer surface which matches the threads of the threaded inner surface of the core 36. The threaded insert 38 also has a threaded inner surface into which an adjusting bolt 46, through washers 40, is screwed. The adjusting bolt 46, is thus anchored to the core 36 through the threaded insert 38. Upon tightening, the adjusting bolt 46 applies pressure to the pressure plate 44, which in turn presses against two spring washers 6 via a thrust bearing 7. The spring washers 6 fit into a recess 41 of tapered housing 42 and, in turn, apply pressure to the housing 42. The thrust bearing 7 provides a low friction contact between the adjusting bolt 46 and the spring washers 6, as the adjusting bolt 46 rotates with the core 36, while the spring washers 6 rotate with the tapered housing 42. Pressure on the spring washers 6 results in movement of the tapered housing 42 onto the tapered bushing 3 and movement of the tapered bushing 3 onto tapered core 36 and the consequent dampening action.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A combination of a first element and a second element rotatably coupled to the first element, with a damper or snubber for slowing rotational movement of said first element relative to said second element, comprising:

(a) a tapered core having a tapered frictional surface and affixed to the first element;

(b) a tapered housing affixed to the second element, said housing having a tapered frictional surface;

(c) a tapered bushing having tapered interior and outer surfaces matching corresponding tapered surfaces of said tapered core and said tapered housing, wherein said bushing is free to rotate with respect to said tapered core and said tapered housing when the interior and outer surfaces of said bushing are not engaged with corresponding tapered surfaces of said core and housing;

(d) a pressure plate proximate to said tapered housing and an adjusting bolt anchored to said first element at a position spaced away from an axis of said housing and abutting said pressure plate such that said adjusting bolt imparts force against said pressure plate which, in turn, imparts force against said tapered housing at a location spaced away from an axis of said core so as to cause a corresponding increase in friction between the interior and outer surfaces of said tapered bushing, said tapered housing and said tapered core so that free movement of said first element relative to the second is dampened; and (e) means for maintaining axial alignment between said tapered core, said tapered bushing, said tapered housing and said pressure plate.

2. The combination according to claim 1, wherein said means for maintaining axial alignment is a pin axially aligned with and passing through said tapered core, said tapered bushing, said tapered housing and said pressure plate.

3. The combination according to claim 2, wherein said core is mounted on said first element and said bushing and said housing are axially aligned with said core.

4. The combination according to claim 1, wherein said adjusting bolt and said pressure plate rotate with said first element.

5. The combination according to claim 1, including a thrust bearing abutting said pressure plate for providing a low friction contact between said applying means and said pressure plate.

* * * * *